Feb. 8, 1938.　　　K. A. SPIETH　　　2,107,912
TIRE DEFLATION INDICATOR
Filed Dec. 31, 1934
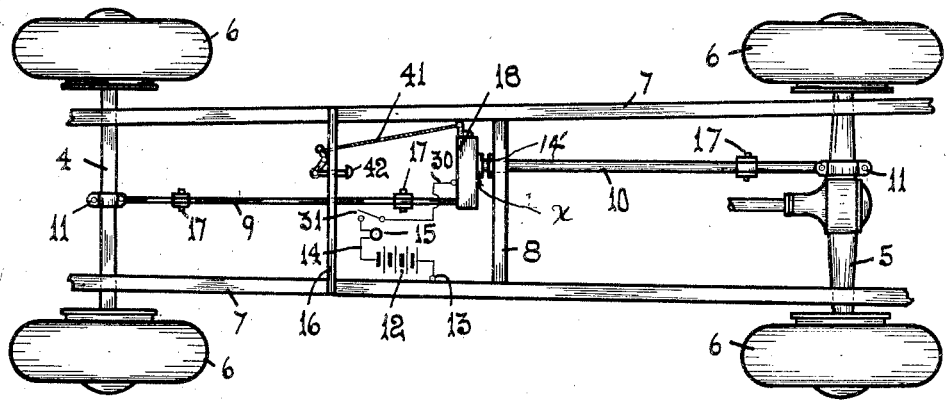
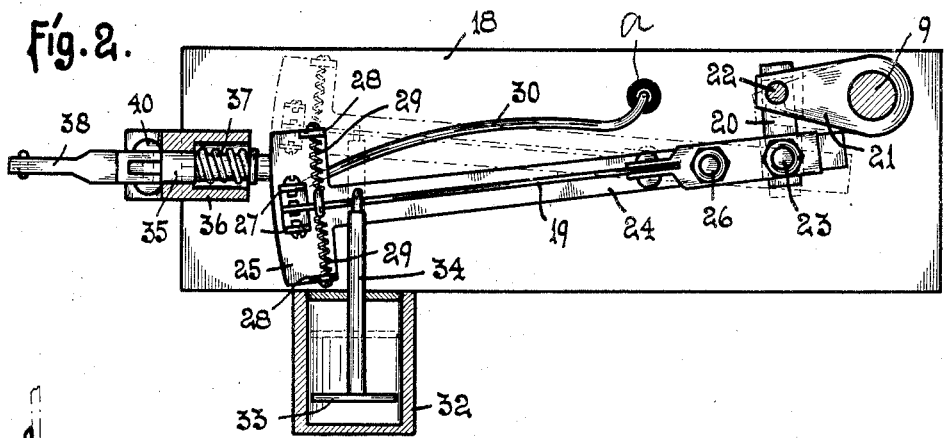
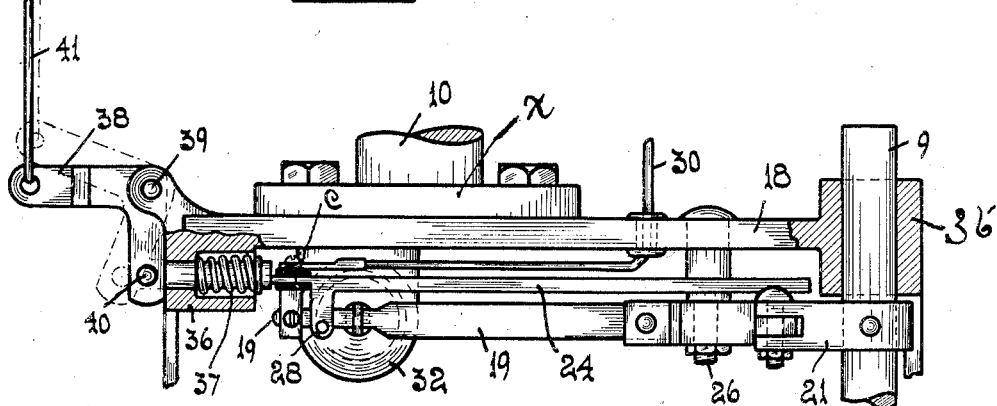
Inventor
By Karl A. Spieth.
Hiram A. Sturges  Attorney Patented Feb. 8, 1938

2,107,912

UNITED STATES PATENT OFFICE 2,107,912

TIRE DEFLATION INDICATOR

Karl A. Spieth, Kearney, Nebr.

Application December 31, 1934, Serial No. 759,956

5 Claims. (Cl. 200—58)

My invention relates to improvements in tire deflation indicators and has for its object broadly, to provide a device which may be applied to the chassis of a vehicle for visibly or audibly indicating to the driver the partial or complete deflation of any one of the pneumatic tires.

One of the objects in view is to provide such a construction that no mechanism will be attached to the tire or wheel, so that these parts will not be encumbered, and that electrical short circuits occasioned by accumulations of mud and exposure to moisture may be avoided.

The invention broadly includes a mechanism for closing an electrical circuit, the said mechanism being actuated by connections with conventional longitudinal rock arms having rigid connection with the axles of the vehicle.

An object of the invention is to provide a mechanism which will not close the electrical circuit when one of the wheels of the vehicle passes over a depression or over an elevated place in the road surface, and vice versa, to hold the electrical circuit closed when there is deflation in one of the tires while driving over uneven road surfaces.

A further object in view is to provide a mechanism including a clutch which may be released by the driver while the vehicle is in motion or in a stationary position, in combination with a movable electrical contact bearing member, in such a manner as will permit the mechanism to automatically move to a position corresponding with the position of the axles of the vehicle at that time, so that when the clutch engages and fixes the movable electrical contact bearing member, deflation in any one of the wheel tires of the vehicle thereafter will cause a closing of the electric circuit.

A further object is to provide universal joints having spring tension for use in combination with rock arms for yielding to excessive canting of one of the axles of the vehicle such as might be occasioned by driving the vehicle diagonally across a ditch.

With the foregoing objects in view and others to be mentioned, the invention presents a new and useful construction, combination and arrangement of parts as described herein and claimed, and as illustrated in the accompanying drawing, it being understood that changes may be made in form, size, proportions and minor details, said changes being within the scope of the invention as claimed.

Referring to the drawing, Fig. 1 is a plan view showing the chassis, axles and wheels of a vehicle the tire deflation indicator mounted thereon.

Fig. 2 is a side view of the contact maker.

Fig. 3 is a plan view of the electrical contact maker.

Referring to the drawing, in Fig. 1 I show a vehicle chassis, a frame 7, wheels 6, front axle 4, rear axle 5, cross member 8 of the frame 7, dash 16, rear axle rock arm 10, clamp 11 for securing rock arm 10 to rear axle 5, front axle rock arm 9 with axle clamp 11, battery 12, signal light 15 and electric leads 13, all of which are merely shown in order to illustrate the utilization of this invention.

Numeral 18, Fig. 1, indicates a housing member mounted on a rock arm 10 and pivotally connected with rock arm 9.

The invention and its operation is based upon the fact that the front and rear axles of a vehicle are normally disposed horizontally and that deflation or partial deflation of a tire will result in an inclined position for the axle. It is obvious that if the axle is provided with a rock arm which will move with the said axle to the inclined position, mechanism may be connected therewith for actuating a signal.

For the utilization of this motion to operate a signal, I have used certain parts which operate to advantage, now to be described.

Numeral 18 indicates a part of the housing and 36', Fig. 3 indicates a bearing in which the rock arm 9 pivots. X indicates a bracket for rigidly securing the housing 18 to rock arm 10, of rear axle 5. Numeral 14', Fig. 1 indicates a hanger bracket in which rock arm 9 pivots.

Numeral 17 indicates universal joints in the rock arms, the said universal joints having spring tensions.

Numeral 21 indicates a crank secured to arm 9, Figs. 2 and 3, the numeral 19 indicates a resilient or elastic contact finger pinioned at 26 and connected with the crank 21 by the link 20.

Numeral 24 indicates an electrical contact bearing member pinioned at 26, normally to be held by a clutch 35 in a stationary position with the housing 18, but upon being released from the clutch 35, the member 24 will move with the contact finger 19 on account of its connection through the springs 29 with contact-finger 19.

The clutching plunger 35 is slidable in bearing 36. Numeral 38 indicates a bell-crank which is pinioned at 39 and connected with plunger 35 and a cord or rod 41 the said rod or cord being connected with lever 42, Fig. 1, operable by the driver, 37 indicating a compression spring for actuating clutch plunger 35.

Numeral 27 indicates the ears of a U shaped contact piece insulated at c and mounted upon the head 26 of the movable member 24. Numeral 30 indicates an electrical conductor insulated at a for electrical connection between the contact points 27 and the signal 15.

Numeral 34 indicates a piston rod which engages contact finger 19, the cylinder 32 containing fluid in which the piston 34 is submerged.

In practice, the contact finger 19 being resilient or elastic and the universal joints in the rock arms 9 and 10 having spring tension, the rocking of either of the rock arms 9 or 10 momentarily caused by the wheels of the vehicle passing over uneven places in the road surface, will yield to this motion between the point of attachment of the rock arm and the point at which the contact finger 19 is engaged by the piston rod 34, and thus no contact of the contact finger 19 with the contact points 27 will be occasioned on account of the stabilizing effect of the piston 33 in the cylinder 32. However, when there is deflation in one of the wheel tires, as the axle moves downwardly to an inclined position, the contact finger 19 exerting an upward or downward pressure in the piston rod 34, slowly moves to make contact with 27, and thus close the electrical circuit which leads to the signal 15 upon the dash 16. It will readily be understood that without resilience or elasticity in the universal joints in the rock arms 9 and 10 and in the contact finger 19 in combination with the checking effect of the piston 33, in driving the vehicle over uneven road surfaces, the contact finger 19 would constantly be closing the electrical circuit to actuate the signal even though no deflation existed in any of the tires of the vehicle. Furthermore, this resilience or elasticity in the contact finger 19 and in the universal joints of the rock arms 9 and 10 is also necessary in order to prevent breakage or permanent distortion in the mechanism of the contact finger in the event where a wheel of the vehicle drops into a depression causing a canting of an axle in excess of the amount occasioned by the deflation of a tire.

And further, in practice, since the relative position of the front and rear axles of a vehicle remain the same while the vehicle is in motion on a straight course so long as there is no deflation in any of the tires, the releasing of the clutch 35, allows the contact finger 19 to move to the position which corresponds with the mean average of the horizontal position of the front and rear axles, and through the springs 29 cause the contact bearing member 24 to move with it, the contact finger 19 assuming a central position between the contact points 27, thus the clutch 35 is again permitted to engage member 24, the contact points 27 remain in a stationary position with finger 19 and the deflation or partial deflation of one of the tires of the vehicle will cause the contact finger 19 to move and make contact with one of the contact points 27 and close the electrical circuit to the signal on the dash.

And further, in practice, universal joints in the rock arms make possible the use of supporting brackets which are attached to the chassis of the vehicle for the support of the rock arms. Without the universal joints in the rock arms it would be impossible to transmit the true canting or rocking motion of the axles to the contact device through supporting brackets attached to the chassis due to the fact that the chassis has motion differing from that of the axles.

Having thus fully described my invention, what I claim as new, is:

1. In a tire deflation indicator, the combination with the front and rear axles of a vehicle, a housing, an arm swingably mounted on the housing and provided with a head-piece, a spring controlled plunger-clamp normally engaging said head-piece and under control for disengagement therefrom, an electrically energized contact-piece on said head-piece, a rock-arm secured to the housing and movable with one axle, a second rock-arm pivotally mounted on the housing and movable with the other axle, and an electrically energized contact-finger movable with the second rock-arm adapted to engage said electrical contact-piece.

2. In a tire deflation indicator, the combination with the front and rear axles of a vehicle, a housing provided with a cylinder, an arm swingably mounted on the housing, a plunger-clamp adapted to be moved for engaging and preventing a movement of said arm and adapted to be moved to disengagement with said arm, an electrically energized contact-piece on said arm, a rock-arm secured to the housing and movable with one axle, a second rock-arm pivotally mounted on the housing and movable with the other axle, an electrically energized contact-finger movable with the second-rock-arm for engaging said electrical contact-piece, and a piston attached to the contact-finger and working in said cylinder for retarding the movements of said contact-finger.

3. In a tire deflation indicator, the combination with the front and rear axles of a vehicle, a housing, an arm swingably mounted on the housing and provided with a head-piece, a plunger-clamp movable in one direction for engaging said head-piece to prevent a swinging movement of said arm and movable in a reverse direction to permit a swinging movement of said arm, an electrically energized contact-piece approximately of U-shape on said head-piece, a rock-arm pivotally mounted on the housing and secured to one axle, an electrically energized contact-finger having a connection and movable with said rock-arm and having a spring-controlled part normally disposed midway between the arms of said U-shaped electrical contact-piece, and a rock-arm rigidly secured to the housing and movable with the other axle, whereby said U-shaped electrical contact-piece may be moved into engagement with said contact-finger by a movement of the last named rock-arm.

4. In a tire deflation indicator, the combination with the front and rear axles of a vehicle, a housing-member provided with a liquid-containing cylinder, an arm provided with an electrically energized contact-piece and mounted swingably on the housing-member, a rock-arm secured to the housing-member and movable with the rear axle, a second rock-arm provided with a crank and movable with the front axle and pivotally mounted on the housing-member, means on the housing member movable in one direction for engaging and preventing a swinging movement of said arm and movable in a reverse direction for permitting a swinging movement of said arm, an electrically energized contact-finger mounted between its ends and connected with said crank and movable by the second rock-arm into engagement with said electrical contact-piece, and a piston having a rod engaging the contact-finger and disposed in the cylinder for retarding the movements of said contact-finger.

5. In a tire deflation indicator, the combination with the front axle, rear axle and dash of a vehicle, a housing, an arm provided with an electrically energized contact-piece and mounted swingably on the housing, a spring-controlled plunger normally engaging and tending to prevent a swinging movement of said arm, a bell-crank on the housing attached to the plunger, a movable hand lever on the dash connected with the bell-crank for disengaging the plunger from said arm, a rock-arm rigidly mounted on the housing and movable with one axle, a second rock-arm provided with a crank and movable with the other axle and pivotally mounted on the housing, and an electrically energized contact-finger pivotally mounted between its ends and connected with said crank and movable with the second rock-arm into engagement with said contact-piece.

KARL A. SPIETH.